June 20, 1933.  S. B. BORQUIST ET AL  1,914,821
BULK GRAIN ATTACHMENT FOR COMBINES
Original Filed Aug. 18, 1928    5 Sheets-Sheet 3
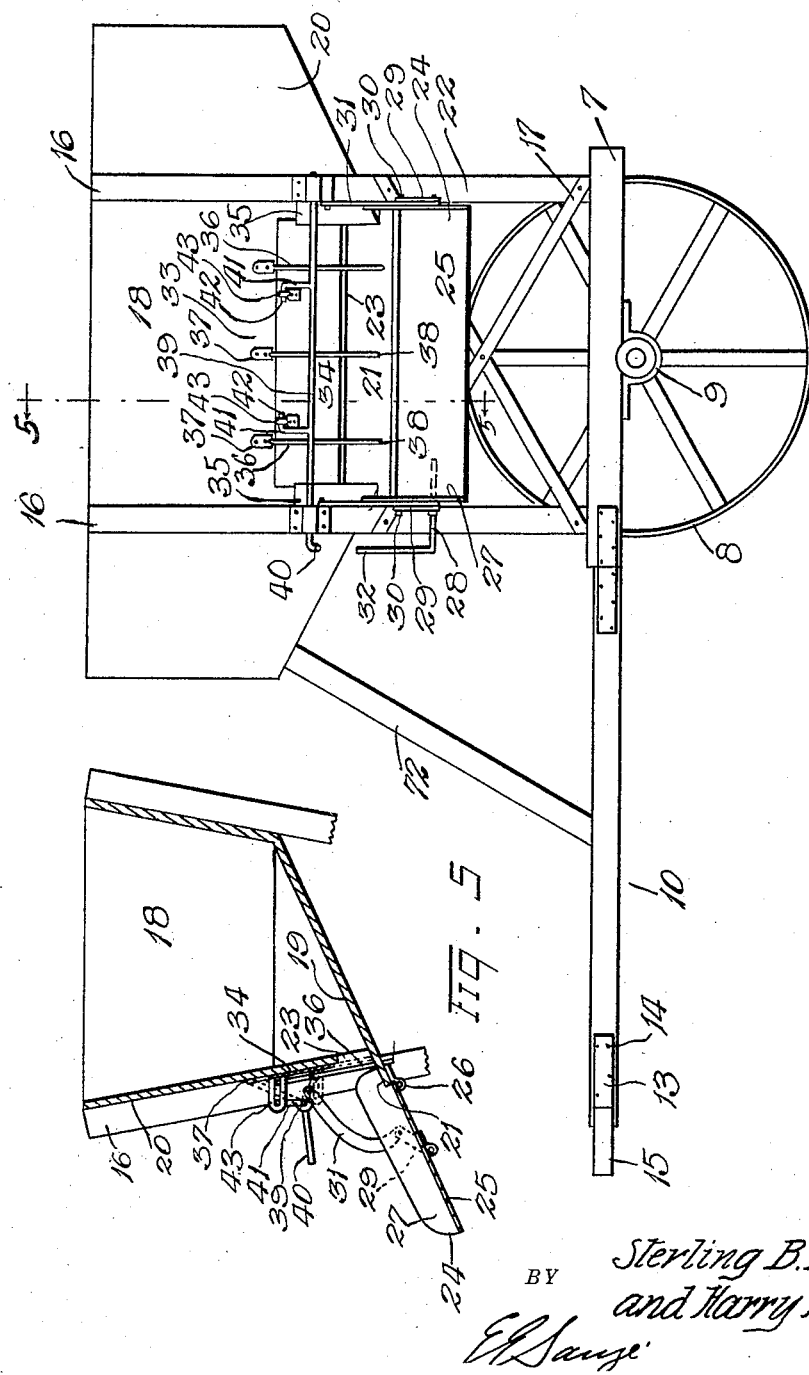
INVENTORS
Sterling B. Borquist
and Harry H. Hicks
BY
ATTORNEY

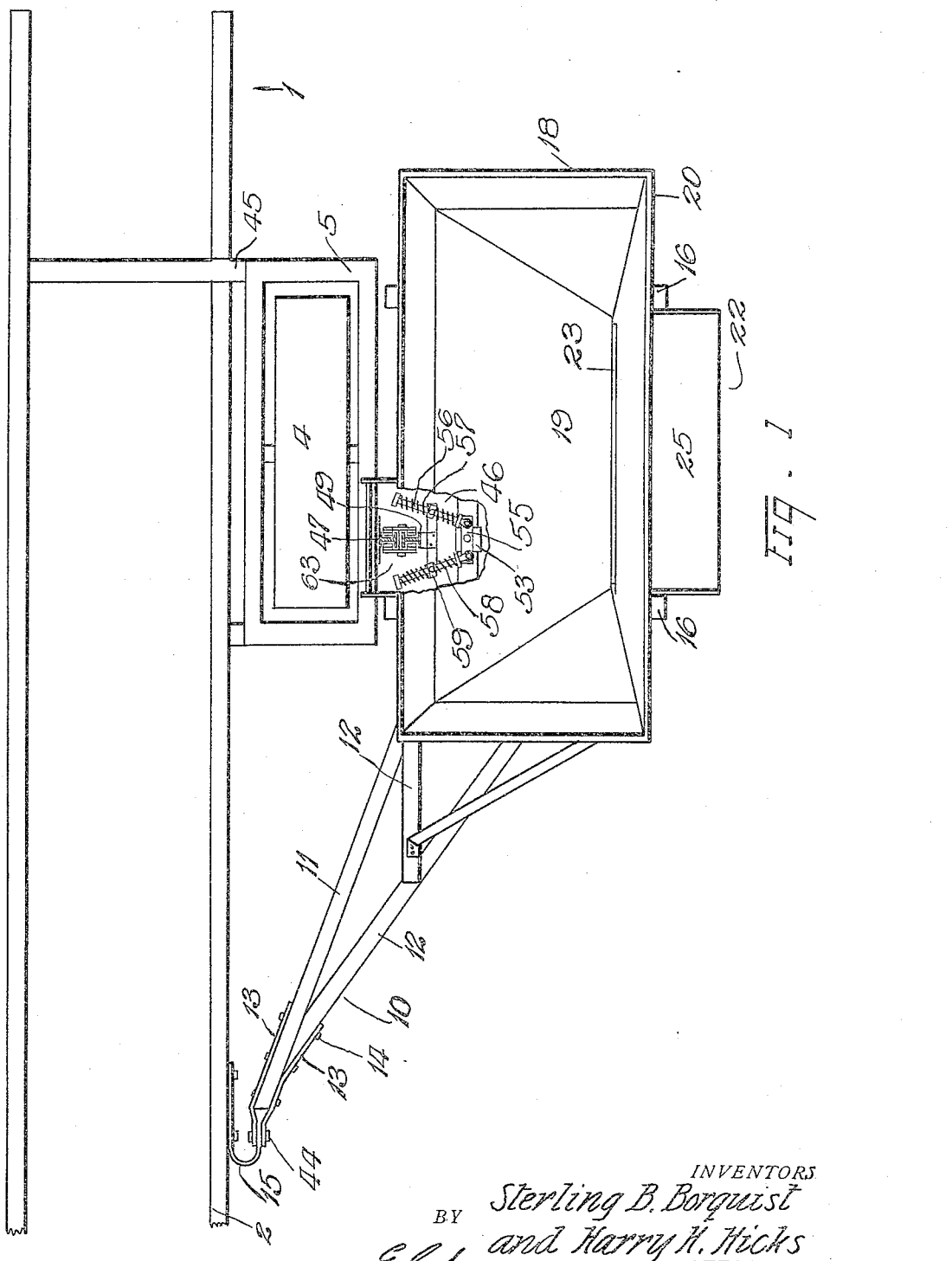

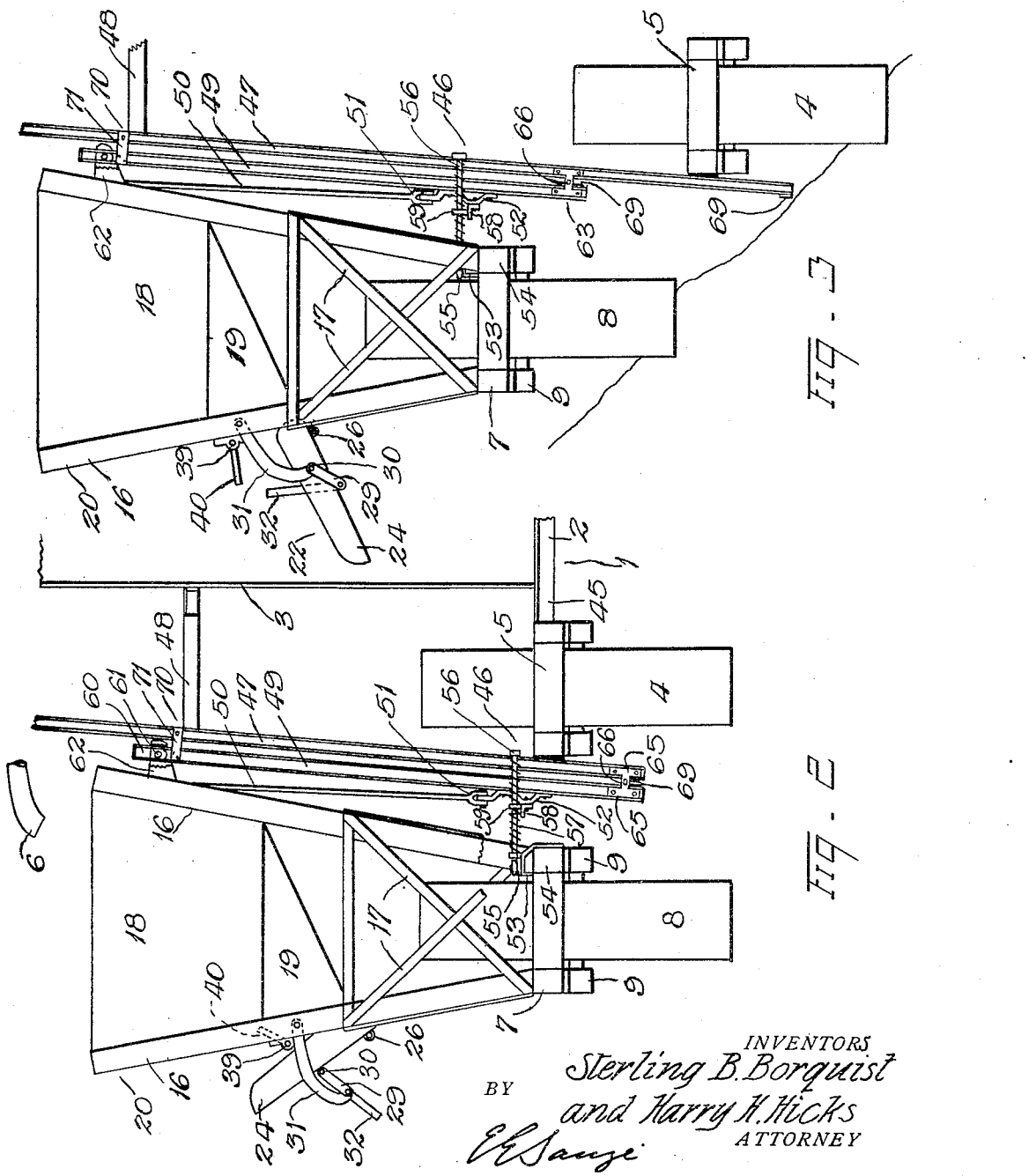

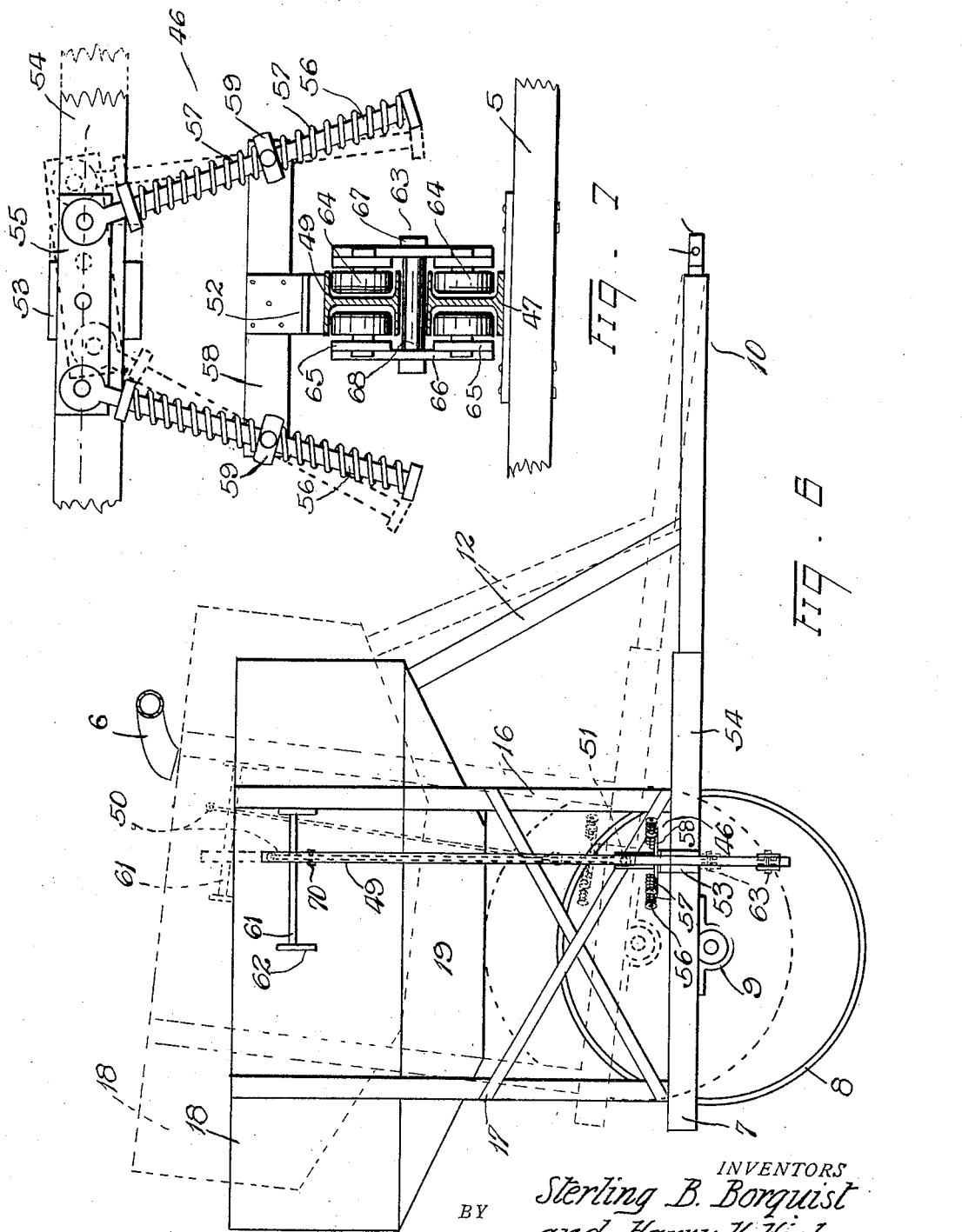

June 20, 1933.  S. B. BORQUIST ET AL  1,914,821
BULK GRAIN ATTACHMENT FOR COMBINES
Original Filed Aug. 18, 1928    5 Sheets-Sheet 5

INVENTORS
Sterling B. Borquist
and Harry H. Hicks
BY
ATTORNEY

Patented June 20, 1933

1,914,821

UNITED STATES PATENT OFFICE

STERLING B. BORQUIST AND HARRY H. HICKS, OF HELIX, OREGON

BULK GRAIN ATTACHMENT FOR COMBINES

Refile for abandoned application Serial No. 300,550, filed August 18, 1928. This application filed September 28, 1932. Serial No. 635,302.

This invention relates to bulk grain attachments for combines and has as one of its objects to provide a bulk grain attachment that may be attached to any class of harvesting machine and which will carry the weight of the threshed grain free of the harvester.

Another object of the invention is to provide a bulk grain attachment for combines whose traction is reduced to a minimum by the use of a single wheel support.

A further object of the invention is to provide a bulk grain attachment for combines that will be drawn by the harvester and providing a novel means of attachment whereby it is applicable for use on hilly ground.

A further object of the invention is to provide a bulk grain attachment for combines whose novel means of attachment provides for movement of the attachment in a vertical arc to compensate for travel over uneven ground and providing a securing means adapted to compensate for the vertical movement and provided for variable movement of the device in turning corners and still maintain the hopper in operable receptive relation to the harvester.

With these and other objects in view reference is now had to the accompanying drawings in which Fig. 1 is a plan view of the device showing its relative position with the main wheel and frame of the harvester;

Fig. 2 is an end elevation of the device and a fragment of a harvester showing the position of the securing means when on level ground;

Fig. 3 is a similar view to Fig. 2 showing the position of the securing means when on hilly ground;

Fig. 4 is a side elevation of the device;

Fig. 5 is a sectional elevation of the device taken on the line 5—5 of Fig. 4;

Fig. 6 is a side elevation of the device taken from the inside and showing the result of the movement thereof in a vertical plane on the securing means;

Fig. 7 is a plan view of part of the securing means (enlarged) showing details of construction and assembly;

Figure 8:
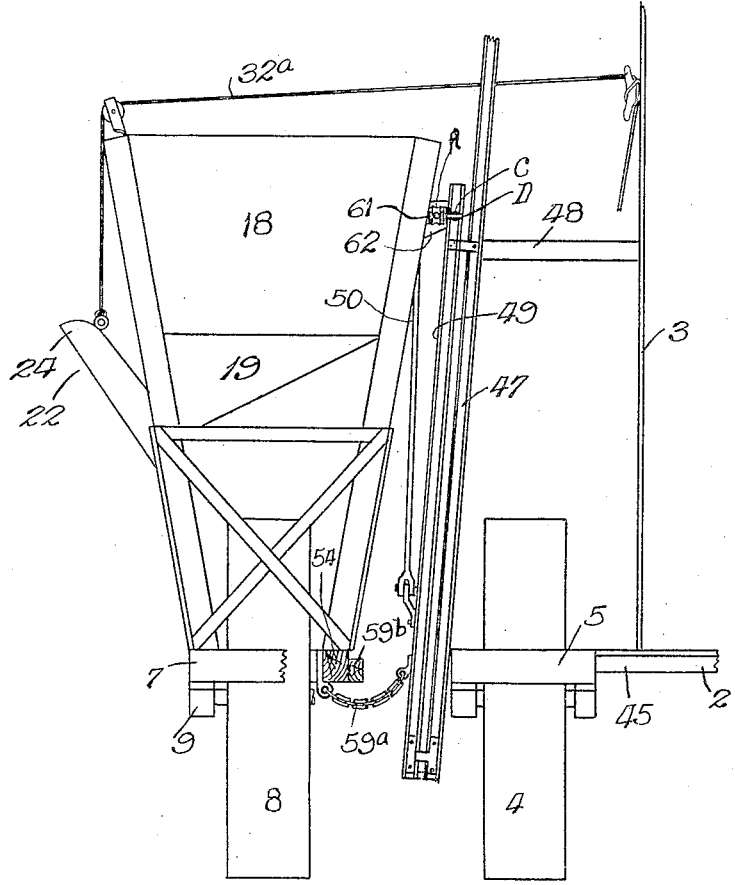
Fig. 8 is an end elevation of the device and shows modifications of the operating means for the chute, the flexible securing means, and a hopper securing means.
Figure 9:
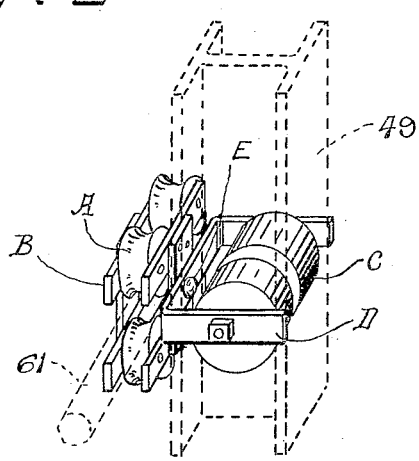
Fig. 9 is a perspective view of the hopper securing means, enlarged.

Having reference to the drawings like numerals refer to like parts throughout the several views and the numeral 1 refers to a harvesting machine, of the combined class, and as harvesters are well known in the arts it is deemed advisable to show only such parts of the harvester to which the invention is directly applicable and hence those parts shown as directly relating to the invention consist of a frame 2, a side wall 3 of the housing of the combine, which side wall is mounted on the frame, a main wheel 4 rotatably mounted in a main wheel frame 5, the latter being secured to the combine in the usual manner of such construction, and a grain discharge spout 6 which conveys the threshed grain to the bulk grain attachment.

The term combine is used herein to designate any harvesting machine to which the device is applicable, but it is particularly intended to designate that particular machine adapted to both cut and thresh the grain at one operation, thereby providing a machine delivering a comparatively great volume of grain requiring a receptacle of relatively great capacity to care for the output of grain substantially and without loss or waste.

In view of the above and contemplating the invention, and in view of the fact that the output of the machine consists of considerable weight which must be provided for in the construction of the device; and further that it is desirable to support this weight independent of the combine; and with due respect to irregularities of the ground over which the combine and the attachment will travel; the invention consists of a wheel frame 7, preferably rectangular in outline, adapted to encompass a wheel 8 positioned therein, and mounted thereon by means of journals 9 of usual construction.

While it is the intent to use a single wheel 8 to support and carry the weight of the device and its contents, a single wheel being more adaptable to this purpose and preferred for that reason, it is obvious that equivalents may be used without departing from the spirit of the invention or from the scope of the claims.

Attached to and made a part of the wheel frame 7 is a tongue 10 which is extended forward, as shown in Fig. 1, consisting of a main member 11 and a brace member 12, these members being joined together at their forward end by suitable irons 13, rigidly secured thereto by the usual bolts 14, the irons terminating in a double strap adapted to receive and be pivotally attached to a hinge strap 15 rigidly secured to the frame 2 in any suitable manner.

Mounted on the wheel frame 7 are uprights 16 preferably positioned with an inclination from the vertical, which uprights are suitably tied together and braced by means of the brace members 17, shown in Figs. 2, 3, 4, and 6, and mounted in and attached to the upper part of the uprights is a hopper 18 which consists preferably of a rectangular receptacle having an open top and having an inclined bottom 19 directed toward the outer side 20 thereof, and having the bottom extended outward to provide a lip 21 in continuation of the bottom which lip forms a part of a discharge spout 22 beginning with an outlet 23 left in the outer side wall 20 in proximity with the bottom 19 to provide an outlet for the grain for delivery therefrom.

Attached to and forming a continuation of this extended lip 21 is a metal chute 24 consisting preferably of a bottom plate 25 hingedly attached to the lip 21, as at 26, and provided with sides 27, and the chute is supported in various positions by a rod 28 extended throughout the width of the chute and secured thereto by suitable clips (not shown) in a manner to provide for a rocking movement of this rod, and the rod is provided with finger members 29 extended parallelly, these members being rigidly secured to the rod and adapted for pivotal engagement at their outer end 30 with curved links 31, the links in turn being pivotally attached preferably to the said uprights which support the hopper in any suitable manner.

The rod 28 is further extended to one side of the chute where it is bent at right angles to provide a suitable operating lever 32 by the movement of which the chute 24 may be raised or lowered to the closed or open position and at the same time supported and locked in either position for a purpose to be explained.

The locking provisions for this chute 24 are novel in the fact that by rotation of the operating lever 32 the finger members 29 will also rotate about the axis of the rod 28 which with their ends pivotally attached to the said links 31 forms a fulcrum upon which to raise the chute as the lever is rotated, and by curving the links the center line of the pivotal points become changed when the chute is raised to the closed position with the result that the chute is thus locked in that position until intentionally relieved, with its weight answering as a lock in the open position.

The purpose of this movement of the chute is to provide a spout 22 that will extend outward when open to a distance sufficient to discharge into a wagon or truck, (not shown) and, when closed to be out of the way when the wagon is being positioned alongside of the hopper 18 to receive the load therefrom. Without these precautions and with the fact in mind that both the combine 1 and the wagon may be moving which might terminate in disastrous results, the necessity for this arrangement is obvious.

If desired the chute may be operated from the combine and when this is deemed advisable a rope 32a may be attached to the chute and, running to the machine, may be made fast as shown in Fig. 8.

As it is essential that the grain is to be contained within the hopper during the interim between the time that the loaded wagon drives away and another emptied wagon takes its place and as it is necessary to provide against any leakage at this or any other time, a sliding gate 33 is provided wherewith to close the outlet 23 of the hopper and this gate consists of a slidably mounted plate 34, having its ends guided by runways 35 attached to the hopper 18 for the purpose, and guides are provided to strengthen the slides against the pressure of the grain, these guides consisting of vertically positioned rods 36 having their upper ends 37 offset and suitably secured to the hopper, with their lower ends 38 secured in the extension lip 21 in any suitable manner, with these rods positioned parallel to the line of movement of the plate.

For the purpose of opening and closing the gate 33 a rod 39 is journalled in the uprights 16 supporting the hopper 18, and this rod is extended across the face of the plate and is provided with an operating lever 40 similar to the operating lever 32 of the chute of the discharge spout 22. The rod 39 has preferably two extension pieces 41 formed integral therewith, and these extension pieces are provided with inturned ends 42 adapted to engage loops 43 secured to the plate 34. By this positioning of the journals upon the uprights 16 and with the loops 43 extended to a position practically in line vertically with said journals it is obvious that upon raising the plate 34 by the manipulation of its operating lever 40 the relative centers of the inturned ends and the rod are such as to support and maintain the plate in the open position against the natural shake and jar of the hopper in its travel, and contra, that when the plate is closed, its own weight and that of its operating lever 40, which is now past center as shown by the dotted line in Fig. 5, will hold the gate in the closed position.

By the above arrangement of the parts forming the locking means for the discharge spout 22 and gate 33, it becomes evident that both these members will become automatically locked in the position set, thus providing against accidental movement of these members.

By referring to Figs. 2 and 3, and also to Fig. 6, it will be noted that the hopper 18 is designed for movement in a vertical arc, this movement taking place at the pivotal point 44 of connection of the forwardly extended tongue 10 and the frame 2 of the combine. It will also be noted that the hopper is secured to the frame 5 of the main wheel 4 of the combine, and to the housing 3 thereof by a cross piece 45 (or cross pieces), this securement providing to maintain the hopper in a position laterally and constant with the position of the combine 1.

In view of the fact however that the hopper 18 is arranged for arcual movement and that it is necessary to support said hopper in a vertical position upon its single wheel 8, a flexible securing means 46 is provided which securing means comprises a vertically positioned main track 47 consisting preferably of an I section, which track is rigidly secured at its lower end to the frame 5 of the main wheel of the combine and has its upper end rigidly secured to the combine wall by braces 48 as shown, and parallel to this main track 47 and adjacent thereto is a hopper track 49 of similar cross section, which hopper track is supported from the hopper 18 by means of a tie rod 50 pivotally attached to the hopper, as shown by the dotted lines in Fig. 6, with the lower end 51 of the tie rod pivotally connected with an offset member 52, which latter in turn is riveted or otherwise secured to the hopper track at its lower end.

The offset member mentioned forms a portion of the yielding securing means 46, intended to secure the supporting frame 7 of the hopper at a fixed distance laterally from the main wheel 4 of the combine and this securing means further consists of a yoke 53 rigidly secured to one of the side members 54 of the rectangular frame 7 surrounding the supporting wheel 8 of the hopper, and pivotally mounted on the top portion of this yoke is a plate 55 positioned parallel to the side member 54 of the frame, and pivotally attached to this plate at both ends thereof, are a pair of diverging rods 56 extended inward toward the combine and positioned to straddle the tracks, with these rods carrying springs 57 being spaced apart and slidably secured to a second plate 58 by collars 59 separating the springs, the second plate in turn having a centrally positioned extension piece riveted thereto, which extension piece forms the offset members 52 before mentioned.

The range of movement of this securing means is shown by comparison of the dotted and solid lines in Fig. 7, which movement will occur to a greater or less degree as the relative positions of the hopper and combine are changed, particularly as when going around corners, and each diverging rod 56 is supplied with opposed springs 57 whereby to restore the supporting frame 7 of the hopper to its normal position and provide a flexible and yielding means therefore connecting the hopper with the combine.

A modified form of flexible securing means may consist of a chain 59a secured to the hopper track 49 and to the side member 54, with a bumper 59b also attached to the side member.

By referring to Fig. 6 and in view of the above, reference is now had to the relative position of the tracks, in which it will be noted first that the hopper track 49 is intended to remain vertical regardless of the arcual movement of the hopper about its pivotal point 44, and second and with this condition existing, that the upper end of the hopper track must be secured to the hopper. To accomodate these two conditions a hopper securing means is provided comprising a slot 60 formed in the upper end of this track 49 and this slot is slidingly engageable with a horizontally positioned shaft 61 secured to the hopper by means of brackets 62 as shown.

A modified form of hopper securing means may be utilized if desired which form consists of concave rollers A mounted in a frame B and adapted to engage the shaft 61, and other rollers C mounted in a second frame D and adapted to engage the hopper track 49, the first and second frame being joined together with a swivel joint E, the whole providing for a universal movement at this point of connection.

By this combination of parts it is now obvious that as the hopper 18 moves about its pivot the hopper track 49 will be elevated by means of the supporting rod 50 as the hopper raises and the position of the upper end of the supporting rod will then be at variance with the original position with respect to the hopper whence the slot in the hopper track will compensate for this variance by this method of connection.

For the purpose of securing these two tracks together and still maintain their longitudinal alignment, two sets of rollers 63 are provided each of which consist of two vertically positioned pairs of rollers 64 rotatably mounted on uprights 65 with these uprights secured together and spaced apart by a cross piece 66, the whole forming one side of the set, with the opposite side formed identical, and secured to its fellow by a bolt 67 and spacer 68, and with the vertical line of the rollers properly spaced apart that the rollers may register with and engage the respective channels of the tracks whereby to permit of independent longitudinal movement of one of said tracks with respect to the other.

Cross pieces 69 are attached at the bottom end of the respective track members and these cross pieces are adapted to form stops to prevent any movement of the rollers off the lower ends of the respective tracks, and a similar roller device 70 is provided at the upper end of the tracks to join these two members at this point, this device consisting however of a single pair of oppositely positioned rollers adapted to engage the channel of the main track, and having straps 71 adapted to be secured rigidly to the hopper track at a position preferably adjacent to the lower part of the above mentioned slot 60 formed in that member, thus to secure the upper ends of the track in alignment.

By this means it is obvious that the relative position of the supporting wheel 8 of the hopper and the main wheel 4 of the combine are maintained yieldingly constant and regardless of irregularities of the ground or whether upon the upside or the downside of a hill the tracks will maintain their parallel position and afford a positive securing means that will support the hopper with its open top in operable receptive relation to the combine.

In this case the term "operable receptive relation" is used to define the position of the hopper beneath the outlet of the grain discharge spout 6 regardless of the arcual movement of that member thereby providing for the use of a connecting means for the hopper that will pull the hopper in the manner of other vehicles, and permit of the use of an independent supporting structure therefor.

In use, the device is attached to the combine by first securing its pivotal connection, then securing the main track to the combine and the hopper track to the hopper and its supporting frame, and completing the assembly by joining the tracks together by means of the rollers as above described. The discharge spout is now extended to a position above the hopper and the machine and device is ready for operation.

As the combine now moves over the ground in the process of harvesting the crop, the hopper is likewise moved without additional propelling means and the threshed grain is emptied into the hopper by means of the above mentioned discharge spout.

It will now be noted that the track of the hopper will parallel the track of the main wheel of the combine regardless of whether the hopper is on the upside of the hill or on the downside and regardless of whether travelling in a straight line or turning corners, and that regardless of the movement of the hopper about its pivot that the flexible securing means will positively maintain the hopper in its operable receptive relation with the combine and with the discharge spout thereof.

As the hopper becomes filled a wagon drives alongside and the driver then lowers the chute of the discharge spout and as soon as conditions are correct for loading the gate is raised when the hopper will discharge into the wagon.

Obviously the operation of filling the wagon may be accomplished either as the machine is in motion or at rest, in either event as soon as the wagon receives its load the gate of the hopper is closed, the chute is raised, and the hopper is then ready for a repetition of the process.

To handle great weights other braces 72 may be utilized to strengthen and support the hopper, one of such braces being shown at 72.

This application is filed in lieu of our abandoned application Serial No. 300,550, filed August 18, 1928.

Having thus described our invention, we claim

1. A bulk grain attachment for combines comprising an independently supported hopper pivotally attached to the combine, and a securing means connecting said attachment and said combine and disposed to permit movement of the hopper in a vertical arc, and independent of the combine, and to maintain said hopper in operable receptive relation with said combine.

2. A bulk grain attachment for combines comprising a wheeled frame pivotally attached to the combine, and supporting a hopper, and a securing means connecting said hopper and said combine and disposed to secure and maintain said hopper in an operable receptive relation to the combine regardless of the irregularity of the ground.

3. A bulk grain attachment for combines comprising a frame pivotally attached to the combine and provided with a single wheel support, a hopper mounted on said frame and provided with a discharge outlet, and a securing means slidably connecting said hopper and said frame and disposed to maintain said hopper erect, and in operable receptive relation with said combine, regardless of the irregularity of the ground.

4. A bulk grain attachment for combines, comprising a frame having an extended tongue pivotally attached to said combine, a hopper mounted on said frame, means to support said hopper independent of said combine, a discharge spout for said hopper, and a movable securing means disposed to maintain said hopper in operable receptive relation with said combine and comprising tracks rigidly attached to said combine and movably attached to said hopper.

5. A bulk grain attachment for combines comprising a wheeled frame positioned adjacent to the main wheel of said combine, an extended tongue formed integral with said frame and adapted for pivotal attachment to the forward end of said combine, a hopper mounted on said frame and provided with a discharge spout adapted to discharge away from the combine, a flexible securing means adapted to maintain said hopper in operable receptive relation with said combine and comprising a main track rigidly attached to said combine, a hopper track movably attached to said hopper, and means flexibly joining said tracks and adapted to permit independent longitudinal movement of each of said tracks.

6. A bulk grain attachment for combines comprising a wheeled frame positioned adjacent to the main wheel of said combine, an extended tongue formed integral with said frame and adapted for pivotal attachment to the forward end of said combine, a hopper mounted on said frame and provided with a discharge spout adapted to discharge away from the combine, a flexible securing means adapted to maintain said hopper in operable receptive relation with said combine and comprising a main track rigidly secured to said combine, a hopper track yieldingly attached to said hopper and adapted to permit an arcual movement of said hopper, and means yieldingly and flexibly joining said tracks and adapted to permit independent longitudinal movement of each of said tracks.

7. A bulk grain attachment for combines comprising a wheeled frame positioned adjacent to the main wheel of said combine, an extended tongue formed integral with said frame and adapted for pivotal attachment to the forward end of said combine, a hopper mounted on said frame and provided with a discharge spout adapted to discharge away from the combine and having an automatic lockable means adapted to lock said spout in an open or closed position, a flexible securing means adapted to maintain said hopper in operable receptive relation with said combine and comprising a vertically positioned main track rigidly attached to said combine, a hopper track positioned parallel and adjacent to said main track and suspended from and yieldingly secured to said hopper, in a manner to permit of arcual movement of said hopper, and means joining said tracks and adapted to permit independent longitudinal movement of the respective tracks.

8. A bulk grain attachment for combines, comprising a wheeled frame positioned adjacent to the main wheel of said combine, an extended tongue formed integral with said frame and adapted for pivotal attachment to the forward end of said combine, a hopper mounted on said frame and provided with a discharge spout adapted to discharge away from the combine and having an automatic lockable means adapted to lock said spout in an opened or closed position, a flexible securing means adapted to maintain said hopper in operable receptive relation with said combine and comprising a vertically positioned main track rigidly secured at its lower end to the frame of the main wheel of said combine and at its upper end to the housing of said combine, a hopper track positioned parallel and adjacent to said main track, and provided with a movable supporting means attached to said hopper and a yielding securing means rigidly attached to the frame of said hopper and to said hopper track, said supporting means and said securing means being adapted to permit arcual movement of said hopper without disturbing the alignment of said tracks, and a series of rollers adapted to join said tracks together and permit of independent longitudinal movement of one of said tracks with respect to the other.

9. A bulk grain attachment for combines comprising a wheeled frame positioned adjacent to the main wheel of said combine, an extended tongue formed integral with said frame and adapted for pivotal attachment to the forward end of said combine, a hopper mounted on said frame and provided with a discharge spout adapted to discharge away from the combine and having means adapted to open or close said spout from the combine, a flexible securing means adapted to maintain said hopper in operable receptive relation with said combine and comprising a vertically positioned main track rigidly secured at its lower end to the frame of the main wheel of said combine and at its upper end to the housing of said combine, a hopper track positioned parallel and adjacent to said main track, and provided with a movable hopper supporting means attached to said hopper and a securing means rigidly attached to the frame of said hopper and to said hopper track, said supporting means and said securing means being adapted to permit arcual movement of said hopper without disturbing the alignment of said tracks, and a series of rollers adapted to join said tracks together and permit of independent longitudinal movement of one of said tracks with respect to the other.

In testimony whereof we affix our signatures.

STERLING B. BORQUIST.
HARRY H. HICKS.